INVENTOR.
Yuichiro Oya
BY
Mestern & Mestern

Feb. 21, 1967 YUICHIRO OYA 3,305,842

TIME-DIVISION MULTIPLEX DIGITAL COMPUTER

Filed Nov. 5, 1963 4 Sheets-Sheet 2

INVENTOR.

Yuichiro Oya

BY

Wenderoth & Wenderoth

INVENTOR.
Yuichiro Oya
BY

INVENTOR.

Yuichiro Oya

BY

United States Patent Office 3,305,842
Patented Feb. 21, 1967

3,305,842
TIME-DIVISION MULTIPLEX DIGITAL COMPUTER

Yuichiro Oya, Kodaira-shi, Japan, assignor to Kabushiki Kaisha Hitachi Seisakusho, Tokyo-to, Japan, a joint-stock company of Japan Filed Nov. 5, 1963, Ser. No. 321,564
Claims priority, application Japan, Nov. 9, 1962, 37/48,996
1 Claim. (Cl. 340—172.5)

This invention relates to digital computers, and more particularly it relates to a new digital computer having an internal compositional arrangement which is time-division multiplexed.

Among recent digital computers, there are many cases wherein increase in operational efficiency of the machine is contemplated by the accomplishment of so-called interrupted computation by time sharing. This time sharing method is carried out by preparing instructions relating to a special jump and simple hardware relating thereto and arranging these instructions in suitable combinations in the programming stage, or by preparing within the machine special hardware to make possible priority interrupted computation of several levels. In other words, the interrupted computation by time sharing in conventional digital computers, in all cases, is largely made possible by the skillful use of the computer, that is by skillful programming, and so a time-division multiplex system of intrinsic nature is incorporated in the internal arrangement itself of the machine.

Accordingly, in the priority interruption for time-shared computation of conventional computers, considerable thought is required in the programming stage, and, moreover, the interruption cannot be carried out in a completely arbitrary manner, being subject to a time sequential limitation. In order to increase the adaptability thereof, a corresponding increase in the hardware related to the priority interruption becomes necessary.

It is an object of the present invention, in its broad aspect, to overcome the above-mentioned difficulties, which are described in greater detail hereinafter.

More specifically, it is an object to provide a new time-division multiplex digital computer of high operational efficiency, in one unit of which simultaneous data processing of a plurality of information signal systems can be accomplished.

The foregoing objects have been achieved by the present invention, which, briefly described, provides a digital computer wherein the internal arrangement, itself, is time-division multiplexed through the effective utilization of pulse delaying devices.

The nature, principle, and details of the invention will be more clearly apparent by reference to the following description, beginning with a brief consideration of a known computer and concluding with a detailed description of a preferred embodiment of the present invention, when taken in conjunction with the accompanying drawings in which like parts are designated by like reference characters, and in which.

Figure 5:
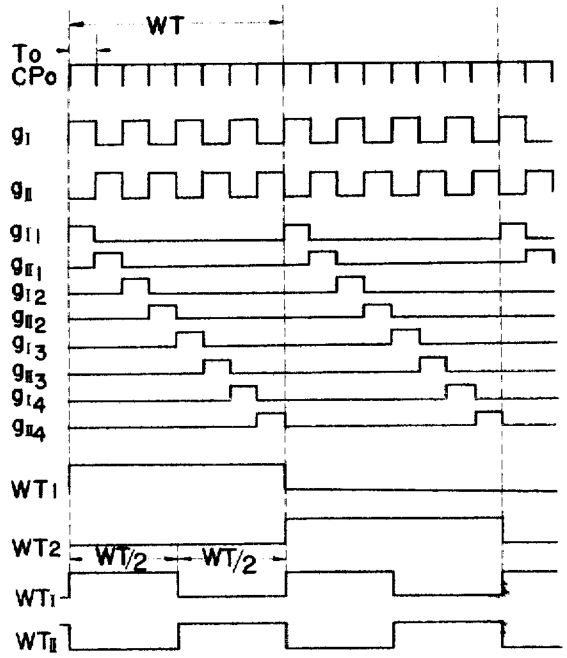
Figure 6A:
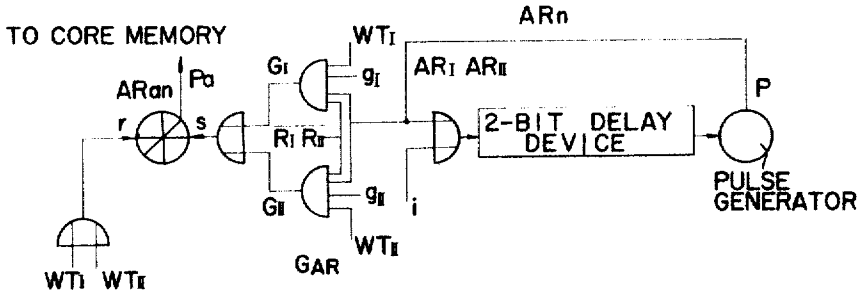
Figure 6B:
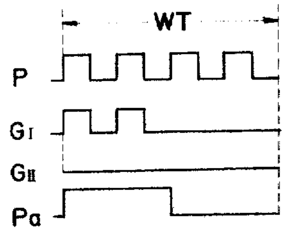
Figure 6C:
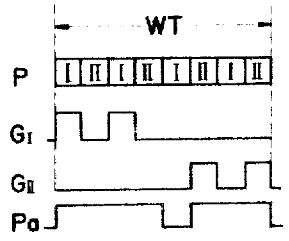
Figure 7:
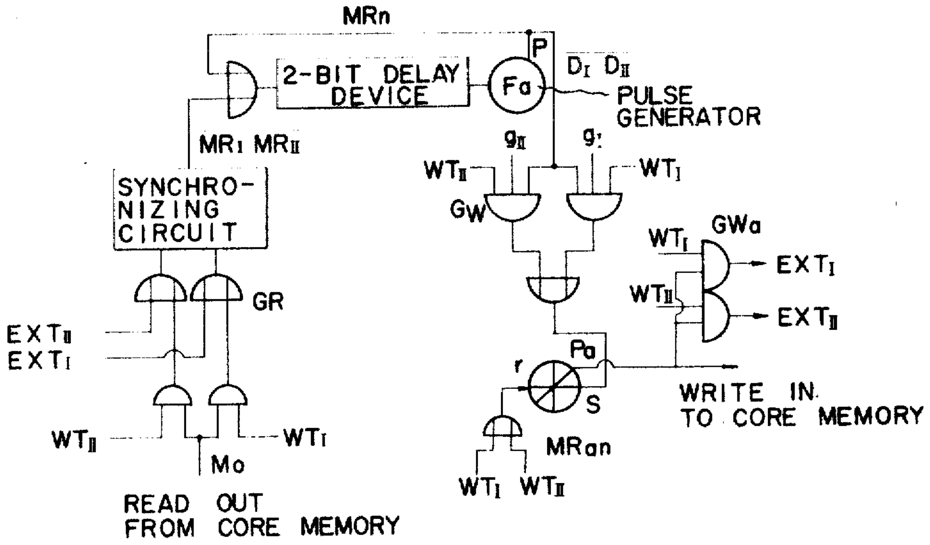

FIGS. 4(*a*), 4(*b*), 4(*c*) and 4(*d*) show flip-flops (or registers) suitable for use in the computer of the present invention and indicating the time-division multiplexing method thereof;

FIG. 5 is a graphical time-chart representation indicating time pulse waveforms in the computer according to the present invention;

FIGS. 6(*a*), 6(*b*) and 6(*c*) show a schematic diagram and waveform diagrams indicating the principle of the address devices of core memory in the computer according to the present invention; and FIG. 7 is a schematic diagram indicating the composition and arrangement of the read-and-write circuit of the memory device.

For a full indication of the nature of the present invention the following brief consideration of a digital computer of known type is believed to be necessary, principally for the purpose of comparison.

Figure 1:
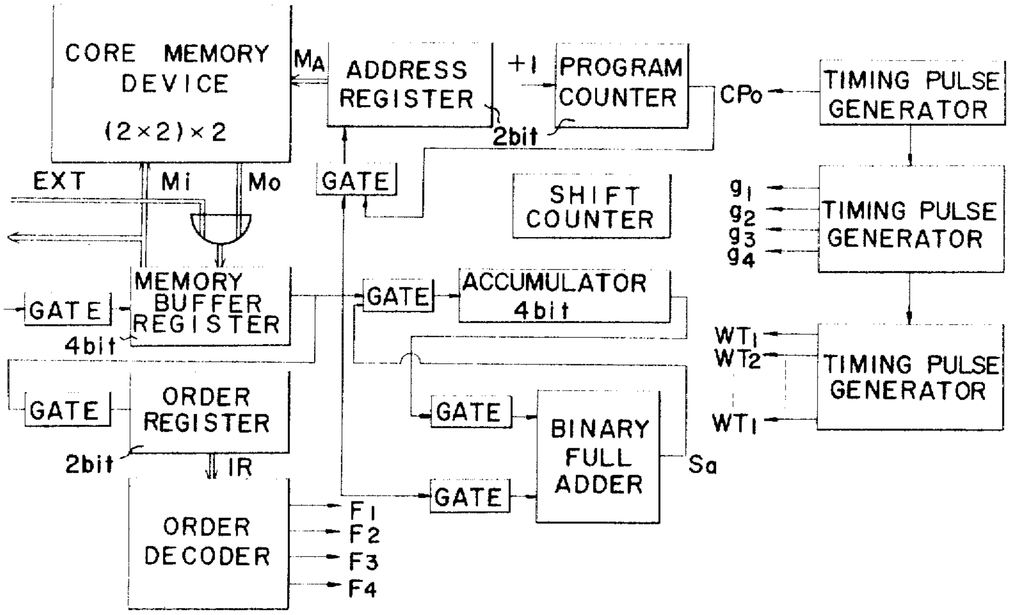
FIG. 1 is a block diagram indicating one example of a serial type digital computer of known type.

In the ordinary serial-type digital computer which is indicated in the most simplified form in FIG. 1, it will be assumed, for the sake of simplicity, that the instruction format has an address part of 2 bits and an order part of 2 bits, and the numerical datum has 4 bits per word. Accordingly, this simple computer has a memory capacity of 4 words and a number of orders equal to 4. This computer comprises, essentially: a core memory device M as the central component, which consists of 4 core memory planes (corresponding to 4 bits per word); a memory buffer register MR (flip-flop, 4 bits); an order register IR (flip-flop, 2 bits); an address register AR (flip-flop, 2 bits); a 4-bit accumulator A; a shift counter SH; a 2-digit program counter PC; timing pulse generators CP, *g*, and WT; order decoder ID (a decoder generating 4 outputs from 2 binary digit code signals); and a binary full adder S.

The simple computer of this example is provided with only the principal parts necessary for executing one instruction, "Addition," and is of the pure serial and synchronous type. Accordingly, the transmission of signals is accomplished entirely by words, and the time sequences of arithmetic operation are carried out with one word time WT ($1WT$=basic clock period $x$) as a unit.

Figure 2:
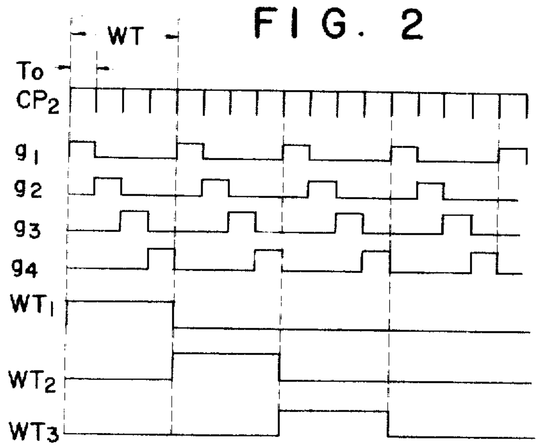
FIG. 2 is a graphical time-chart representation indicating various timing-pulse waveforms.

In FIG. 2, which indicates the various timing pulses used in the example computer shown in FIG. 1: $CP_0$ is a clock pulse with period $T_0$; $g_1$, $g_2$, $g_3$, and $g_4$ are timing pulses for dividing one word time WT into bit lengths (4) per word; and $WT_1$, $WT_2$ . . . . . . . . . . are word timing pulses used for determining the sequence of execution of instruction since the execution of one instruction is accomplished with one word time as a unit.

The operation of the above-described, pure serial and synchronous type computer will now be described with respect to addition as an example.

Instruction read-out is accomplished from the core memory device M in accordance with the stored address in the address register AR, which address has been set and memorized in the first word time WT–1 by the contents of the program counter PC in the preceding word time, that is, the final word time of the preceding instruction step, and an instruction word is introduced by way of a path $M_0$ into the memory buffer register MR. In the succeeding word time WT–2, the instruction word in the memory buffer register MR is divided into an address part (address of operand) and an order part, which are then transferred respectively to the address register AR and the order register IR. In accordance with the content of the order register IR, the order decoder ID operates immediately and sends out as its output a control signal indicating that the order to be executed in this instruction step is addition.

In the word time WT–3, an operand necessary for addition is read out from the memory device M by way of the path $M_0$ to the memory buffer register MR in accordance with the address of operand stored in the address register AR in the word time WT–2. In the word time WT–4, serial addition is accomplished by supplying the operand in the memory buffer register MR and the numerical data in the accumulator A to the binary full adder S, and the result is passed through a path $S_a$ and introduced into the accumulator A to complete the addition operation. Finally, the fact that the word time WT–4 is the last word time $WT_E$ with respect to the addition instruction step is indicated, and the operation proceeds to the next instruction step.

Although the shift counter SH of the computer shown in FIG. 1 was not used in the above-described addition instruction, it becomes necessary in the execution of a shift instruction and operations such as multiplication and division. The signal paths shown by double lines indicate parallel transfer (4 channels in this case) of word signal, and the paths shown by signal lines indicate transfer of serial signals. All exchanges of information wtth external equipment are accomplished by passage once through the memory buffer register MR by way of paths EXT.

In a known computer of the above-described system, data processing with respect to only one channel information signals is carried out at the same time. The present invention, however, provides a computer of high efficiency wherein the technique of time-division multiplexing is applied to each circuit so as to afford independent data processing for each channel with respect to a plurality of information signal system.

In the computer of the present invention, furthermore, the core memory device is arranged to be used commonly by the multiplex channels, and exchange of information between different channels is made possible through the core memory device.

Figure 3:
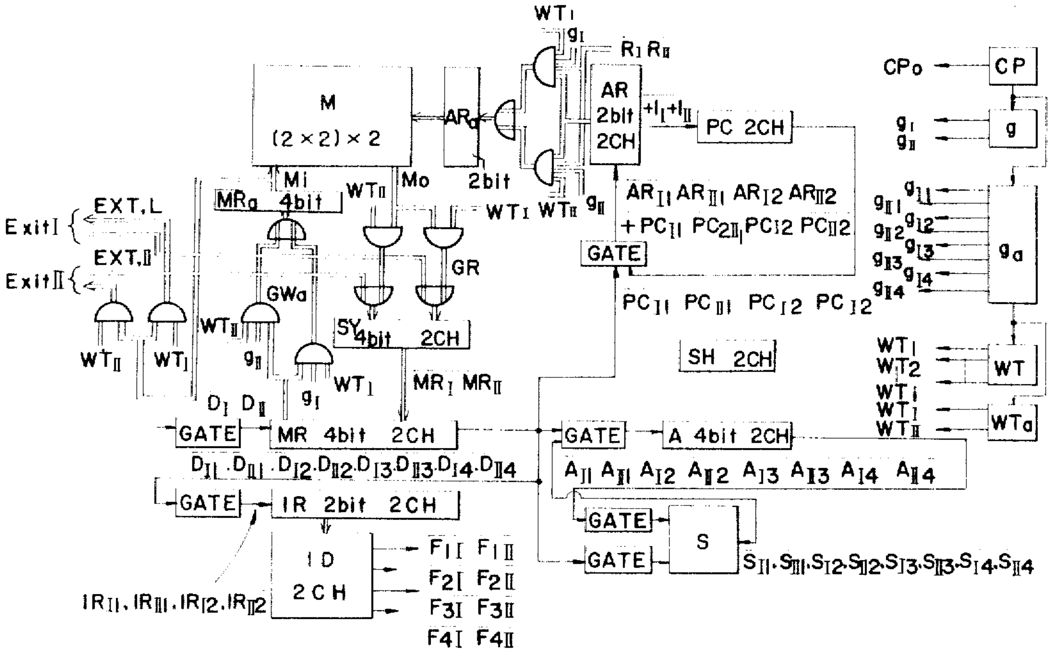
FIG. 3 is a schematic diagram, mostly in block diagram form, indicating the composition and arrangement of the preferred embodiment of the invention.
Figure 4A:
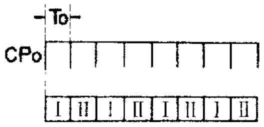
Figure 4B:
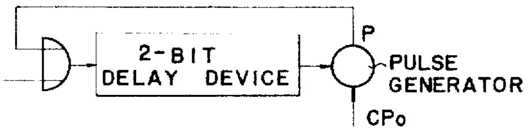
Figure 4C:
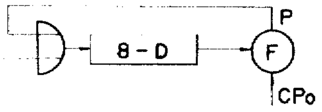
Figure 4D:
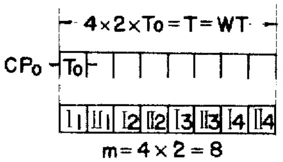

The details of the present invention will now be described with respect to a preferred embodiment of the invention as shown in FIG. 3. For the sake of simplicity, the number of multiplex channels is taken as two, one word length is taken a 4 bits similarly as in the case shown in FIG. 1, and the instruction format and, accordingly, the memory capacity and number of orders, are also taken to be the same as those in the case shown in FIG. 1. In the computer of this invention shown in FIG. 3, although MR, IR, and AR respectively designate registers of 4 bits, 2 bits, and 2 bits, they differ from those shown in FIG. 1 in that the flip-flop of each stage of each register is time-division multiplexed in two channels.

The timing pulses in this arrangement are as indicated in FIG. 5. The time domains for respectively handling the information groups of the two channels are divided into two divisions in accordance with the basic clock pulse of period $T_0$, the first and second time channels are respectively established, and channel signals for control $g_I$ and $g_{II}$ necessary for causing various arithmetic operations to be carried out within the respective time channels are produced. Then, in order to divide one word time WT of 4 bits per word into two channel divisions, that is, into 8 sections, bit pulses $g_{I_1}$, $g_{II_1}$, $g_{I_2}$, $g_{II_2}$, $g_{I_3}$, $g_{II_3}$, $g_{I_4}$, and $g_{II_4}$ corresponding to respective channels and respective bits are generated from a time pulse generator $g_a$. These bit pulses are used for designating the channel numbers and digit signals of time serial signal pulses and are necessary for various arithmetic operations.

Furthermore, in order that the control operation for execution of instruction be carried out with one word as a unit, it is necessary to establish one word time WT as a unit time of instruction execution. For this purpose, word timing pulses $WT_1$, $WT_2$ . . . . . . . $WT_1$ are generated. One instruction is completed within a time interval which is an integral multiple of the word time. However, the sequential number of the word time at any one time is not necessarily coincident with respect to the first and second channels, the general case being one wherein, with respect to simultaneous word times, word times of mutually different numbers correspond to the respective channels.

The arithmetic control may be carried out without any adverse effect whatsoever by alternately dividing the word time in the first and second channels, as indicated in FIG. 4(*a*), and thereby it is possible to execute arithmetic operation of both channels with overlapping. However, it is necessary to carry out, separately, the reading out and writing in of information from the commonly utilized core memory device so that there will be no over lapping in time with respect to the separate first and second information channels. For this purpose, one word time WT is further divided into halves, and timing pulses $WT_I$ and $WT_{II}$ for dividing word time, which pulses correspond to half word times and are for the purpose of using the times of the former and latter of the said halves for reading out and writing in of the information groups of the first and second channels, respectively, are generated by a timing pulse generator $WT_a$.

Each of the time-division multiplex flip-flop circuits of the various bits, which circuits are highly important in the computer shown in FIG. 3, has a composition and arrangement as is indicated in FIG. 4(*b*), comprising a 2-bit delay device 2–D and a pulse regenerator F. By feeding back the output P of the pulse regenerator F to the input side of the delay device 2–D, the digital information of two channels can be held dynamically, and it becomes possible to accomplish flip-flop operation of the two channels. Through the use of this circuit as the flip-flop of each bit of the shift register, it is possible to form a 2-channel multiplex shift register.

In this case, the assigned times of the information are caused to be such that, as indicated in FIG. 4(*a*), the information pulses of the first and second channels are introduced alternately into a time channel which is divided into divisions of the period of the basic synchronizing pulse $T_0$. For the delaying device, a pulse delaying device utilizing a capacitor temporary memory and multiphase synchronizing pulse can be used if the basic clock frequency is up to approximately 200 kc. In the case when this clock frequency is 1 mc. or higher, means such as an electromagnetic delay line having a helical line is suitable.

The accumulator A of 4 binary digits shown in FIG. 3 requires a register capacity of 8 bits in order to effect multiplexing in two channels, and a dynamic register formed by the combination of an 8-bit delay device 8–D and a regenerative circuit F as shown in FIG. 4(*c*) is used. In this case, the information of each digit of the first and second channels is handled with a time arrangement as indicated in FIG. 4(*d*). The cycle time of the aforementioned accumulator is one wordlength, 1WT, and is 8 times the basic clock period $T_0$. Accordingly, although the computing speed of the computer, by multiplexing in two channels, becomes one half of that in the case of no multiplexing, the total computing capacity does not change since the information of two channels can be treated. The shift counter SH and program counter PC are formed by connecting dynamic flip-flops by a known method so as to constitute appropriate counters, the said dynamic flip-flops being formed similarly as described above for the case of the accumulator A by using delay devices of delay times corresponding to the required bits determined by the required number of digits and number of multiplex channels.

A second memory buffer register $MR_a$ consisting of a static flip-flop of 4 bits and a second address resister $AR_a$ consisting of a static flip-flop of 2 bits are used.

In order to multiplex the decoder ID and full adder S, all of the flip-flop elements contained in their functional circuits are replaced by the afore-described 2-channel multiplex flip-flops.

The manner in which information is treated by the operation of the above-described time-division multiplex computer according to the present invention is described hereinbelow with respect to addition as an example, similarly as in the case shown in FIG. 1.

It will be first assumed that a certain word time corresponds to the first word time WT–1 of addition with respect to the first channel. It will be further assumed that, at this time, the second channel is in the process of executing an entirely separate instruction. In the preceding word time, that is, the last word time of the preceding instruction, the address of the instruction to be executed next with the content corresponding to the first channel of the program counter PC, that is, with the information signal of the first channel, is already transferred to the 2-channel multiplex address register.

Accordingly, the address corresponding to the first channel is stored in the 2-channel multiplex flip-flop of 2 bits (AR) of the arrangement indicated in FIG. 4(*b*) in the state indicated in FIG. 4(*a*) and by the designation P in FIG. 6(*b*). In the word time WT–1, however, when a memory reading control signal $\overline{R_I R_{II}}$ (which is also a 2-channel multiplex signal of the type indicated in FIG. 4(*a*), but in this case, a pulse is produced in only the signal $R_I$ corresponding to the first channel, and the signal $R_{II}$ has no pulse) arrives with respect to the first channel, the content $\overline{AR_I AR_{II}}$ (parallel 2 bits) of the two 2-channel flip-flops of the address register AR is caused by the action of a gates $G_{AR}$ as shown in FIG. 6(*a*) to pass through only the part of $WT_I$ of the content $AR_I$ corresponding to the first channel, moreover, through only the part of $WT_I$ of the former half of the word time WT–1, as indicated in FIG. 6(*b*), and to set the second address register $AR_a$. The second address register $AR_a$ is a 2-bit static register.

Thus, the address of instruction corresponding to the first channel from among the contents of the address register AR is transferred to the second address register $AR_a$ and is held therein in a static form as indicated by $P_a$ in FIG. 6(*b*). Thereafter, it becomes capable of contributing fully to the address selection of core memory in a form similar to that of the address selection of an ordinary core memory. Even if the word time at the instant is corresponding to the word time WT–1 with respect both to the first and second channels, the address selection according to the foregoing considerations becomes as is indicated in FIG. 6(*c*), being appropriately assigned by time sharing to address selection of the instruction for the first channel in the former half word time $WT_I$ of the word time WT–1 and to address selection of the instruction for the second channel in the latter half word time $WT_{II}$ of the word time WT–1. It is to be observed, therefore, that the address selection of the memory device with respect to the two channel becomes possible without any difficulty whatsoever.

When the selection of instruction address within the memory device is accomplished in the above-described manner, the instruction entered in the selected address is read out in the read-out wire of the 4-bit parallel $M_o$ in FIG. 3 and in FIG. 7, in accordance with the generally known core memory read-out process. It is clearly apparent from the afore-described address selection method that the information read out in the former half word times $WT_I$ of WT–1 to $M_o$ is the instruction corresponding to the first channel. Therefore, this instruction, upon being divided at the gate $G_R$ by the action of the half word time pulse $WT_I$ in the time WT–1, is introduced into the first channel side of the input of a synchronizing circuit $S_y$ for 2-channel multiplexing and, upon being synchronized with the time corresponding to the first channel, as indicated in FIG. 4(*a*), is introduced into the set input of the 4-bit, 2-channel multiplex register MR of the bits corresponding to the respective read-out wires (FIG. 7). Since these operations become parallel operations of a number equal to the number of bits per word, that is, the number of core planes, four gates GR and four circuits $S_y$ become necessary.

The reception of information signals from outside of the apparatus and their introduction into the computer is accomplished, as indicated in FIG. 7, by causing these signals first to take an OR logic with the readout signal from the core memory device in a gate within GR, and then by introducing them as before in the aforementioned synchronizing circuit $S_y$.

In this manner, the reading out operation into the first time channel of the multiplex register MR of the instruction stored within the memory device of the selected address corresponding to the first channel is completed. If an information is read out in $M_o$ in the time corresponding to $WT_{II}$, it will be apparent that this information is an instruction corresponding to the second channel. In this case, therefore, this instruction is synchronized in the second time channel by the same operation as described above and is introduced into the second time channel of the multiplex register MR.

Next, in the word time WT–2 (in this example, it will be assumed that WT–2 is applicable only with respect to the first channel, and that, with respect to the second channel, another instruction step is being executed in the corresponding time) a shaft operation is applied on the 4-bit shift register MR. However, the shift pulse is also a 2-channel multiplex signal, and, in this case, the shift pulse appears in only the first time channel, whereby only an information signal corresponding to the first time channel in the register MR is shifted out and sent out from the register MR. In this manner, the instruction corresponding to the first channel is divided into two parts, the address part and the order part of the operand, and the two parts are also transferred respectively to the 2-channel multiplex, 2-bit registers AR and IR.

At this time, the output from the register MR is a time serial signal $$\overline{D_{I_1}D_{II_1}D_{I_2}D_{II_2}D_{I_3}D_{II_3}D_{I_4}D_{II_4}}$$

(where, in the case of this example, the part corresponding to the second channel is assumed to be outside of the instant problem, and $$D_{II_1}=D_{II_2}=D_{II_3}=D_{II_4}=\text{(unknown)}.$$

The content sent to the register AR is a time serial signal $$\overline{AR_{I_1}AR_{II_1}AR_{I_2}AR_{II_2}}$$

and the content sent to the register IR is a time serial signal $$\overline{IR_{I_1}IR_{II_1}IR_{I_2}IR_{II_2}}$$

(where, in the case of this example, the part corresponding to the second channel is assumed to be outside of the instant problem and is unknown, and, one hand, $$IR_{I_1} \text{ and } IR_{I_2}$$

represent order codes for the purpose of addition).

When the signal $$\overline{IR_{I_1}IR_{II_1}IR_{I_2}IR_{II_2}}$$

enters the register IR, the order decoder IR immediately operates and produces as an output one of the signals from among 2-channel multiplex signals $$\overline{F_{1_I}F_{1_{II}}},\ \overline{F_{2_I}F_{2_{II}}},\ \overline{F_{3_I}F_{3_{II}}} \text{ and } \overline{F_{4_I}F_{4_{II}}}$$

It will now be assumed that the signal $F_1$ corresponds to the order of addition. Then, these signals participate in the on-off operations of control gates of various type at various points within the apparatus for the execution of required instruction designated by the program with respect to each of the first and second channels.

In the case of description of this example, with the order part of the instruction corresponding to the first channel transferred from the register MR to the register IR, only the signal $F_I$ corresponding to the first channel in the signals $\overline{F_{1_I}F_{1_{II}}}$, $\overline{F_{2_I}F_{2_{II}}}$, $\overline{F_{3_I}F_{3_{II}}}$, and $\overline{F_{4_I}F_{4_{II}}}$ is newly substituted to produce an output to $F_{1_I}$, and a control signal is sent tot he various gates at various points so as to make possible addition with respect to the first channel information signal.

In the word time WT-3 (which is with respect to the first channel, being unknown with respect to the second channel), the address of the operand for the first channel set and stored in the register AR in the preceding word time WT-2 is transferred to the register $AR_a$ by the addition control signal $F_{I_1}$ of the first channel of this ID output $\overline{F_{I_1}F_{II_1}}$, and is stored in a static form in the register $AR_a$. Then, in accordance with the content thereof, an operand necessary for addition is read out from the memory device, through GR, at the register MR. This operation for reading out the operand is exactly the same as the operation for reading out the instruction in the word time WT-1.

In the word time WT-4 (which is with respect to the first channel, being unknown with respect to the second channel), the first channel part of the operand $$\overline{D_{I_1}D_{II_1}D_{I_2}D_{II_2}D_{I_3}D_{II_3}D_{I_4}D_{II_4}}$$

in the register MR read out in the word time WT-3 and the first channel part of the numerical data $$\overline{A_{I_1}A_{II_1}A_{I_2}A_{II_2}A_{I_3}A_{II_3}A_{I_4}A_{II_4}}$$

in the accumulator A are also passed through the 2-channel multiplex binary full adder S by the appropriate on-off operations of the various gates at the various points due to the first-channel part $F_{I_1}$ of the addition control signal $\overline{F_{I_1}F_{II_1}}$, and serial addition of two numerical data is carried out. The result, $\overline{S_{I_1}S_{II_1}S_{I_2}S_{II_2}S_{I_3}S_{II_3}S_{I_4}S_{II_4}}$ (which, in the case of this example, is unknown with respect to the second channel part) enters the accumulator A, and the addition operation is completed.

Finally, the fact that the word time WT-4 is the last word time WT-E with respect to the first channel is indicated, and information treatment of the first channel signals advances to the next instruction step.

In the foregoing description, it was assumed that, during the execution of addition by the first channel, the second channel is executing some other instruction. It is apparent, however, that even if both channels begin addition at exactly the same time, or even if the second channel begins addition from any word time while the first channel is in the process of executing addition, both channels can execute their respective additions without any interference or adverse effect whatsoever.

The method of writing in the content of the register MR into the memory device, in contrast to memory reading out, which writing in was not necessary for addition instruction operation, will now be described. In this case, in order to commonly utilize the core memory with respect to a 2-channel multiplex information signal, it is necessary to avoid overlapping of the writing in of the two channels. For this purpose, the first and second channel information signals in the register MR are extracted respectively in the former and latter halves $WT_I$ and $WT_{II}$ of the word time by the action of the gates $G_W$ shown in FIG. 7 which is similar to the case of address selection indicated in FIG. 6. Then, by a process similar to that in the case of address selection, a second memory buffer register $MR_a$ is set, and, by a known, ordinary, core memory writing operation, the memory content held in a static state in this register $MR_a$ is written in the memory device by time sharing as overlapping is avoided.

In the case when information is to be transferred to the outside from the register MR, the static output of the register $MR_a$ is sent out upon being separated by gates $G_{W_a}$ into the first and second channels. By the above-described processes associated with reading and writing, exchange of information mutually between the two channels is possible by way of the core memory device.

Although in the foregoing disclosure, for the sake of simplicity, the description has been restricted to the case wherein a computer of a word format of 4 bits per word is multiplexed in two channels, it will be apparent that, in general, multiplexing of a computer having a word format with a word length of any number of bits into any number of channels is possible with considerable adaptability by the practice of the present invention.

Although in the time-division multiplex computer of this invention, the computing speed for each channel decreases in inverse proportion to the number of multiplex channels, the total information treating capacity remains unchanged. Furthermore, in some cases of application of the computer of this invention, such as that of a control computer directly coupled to controlled equipment and used with real time, the required computing speed is determined by the demand from the controlled equipment, and the use of any higher speed is of no value. For such applications, a signal computer according to the present invention, wherein multiplexing is achieved through the use of circuit elements and memory elements with ample margin in its computing speed capacity, can accomplish simultaneous data processing of a plurality of information signal systems, wherefore the present invention affords great economic advantage.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What is claimed is:

A time-division multiplex digital computer comprising a memory device; an arithmetic operation device constituted by a register, a decoder, an accumulator and auxiliary operational devices formed by dynamic flip-flop circuits, said dynamic flip-flop circuits being composed of a pulse delaying device having a delay time for the number of bit corresponding to the number of the required multiplex channel; a regenerative circuit for regeneratively amplifying the delayed output pulse of said pulse delaying device and a feedback loop for feeding back the output of said regenerative circuit to the input side of said pulse delaying device; and means for imparting clock pulses to said regenerative circuit; a memory buffer register constituted by a static flip-flop circuit through which transfer of information between said memory device and said arithmetic operation device is accomplished by carrying out writing-in and reading-out of said informations with respect to a designated address within said memory device; a first channel separating device to separate and parallelize for each channel the time-division multiplex memory address information; a first synchronizing circuit to multiplex the read-out signals from said memory device; a second channel separating device to separate and parallelize for each channel the time-division multiplex write-in information; means for supplying multiplex synchronizing pulses of a phase number corresponding to the number of said multiplex channel and word dividing pulses to divide one word time into the number of said multiplex channel to said first and second channel separating devices and said first synchronizing circuit; a second synchronizing circuit for time-division multiplexing input signals of a plurality of channels from outside of a computer; and a third channel separating device for separating the output of said memory buffer register to separate channels and supplying said separated outputs to the outside.

No references cited.

ROBERT C. BAILEY, *Primary Examiner.*

R. B. ZACHE, *Assistant Examiner.*